United States Patent [19]

Gaunt

[11] Patent Number: 4,862,916

[45] Date of Patent: Sep. 5, 1989

[54] GAS QUANTITY MEASURING DEVICE

[75] Inventor: John Gaunt, Notts, England

[73] Assignee: Gaslow International Ltd., The Park

[21] Appl. No.: 174,605

[22] Filed: Mar. 28, 1988

[30] Foreign Application Priority Data

Apr. 2, 1987 [GB] United Kingdom ............... 8707925

[51] Int. Cl.$^4$ ..................... F16K 37/00; G01L 7/08
[52] U.S. Cl. ..................... 137/557; 137/614.19;
137/505.46; 73/715
[58] Field of Search ............ 137/557, 559, 505.36,
137/505.46, 505.47, 614.19; 73/715

[56] References Cited

U.S. PATENT DOCUMENTS

Re. 19,902  3/1936  Sprague et al. ................ 73/715
911,505     2/1909  Kleinfeldt ................. 137/505.46

FOREIGN PATENT DOCUMENTS 0019854  12/1980  European Pat. Off. ....... 137/505.46
715453    12/1941  Fed. Rep. of
                   Germany .................. 137/505.46
1953945   10/1969  Fed. Rep. of
                   Germany .................. 137/505.47

Primary Examiner—A. Michael Chambers
Attorney, Agent, or Firm—Poms, Smith, Lande & Rose

[57] ABSTRACT

A liquified gas pressure regulator including a gas inlet and a gas outlet, a valve for controlling flow of gas from the inlet to the outlet, a control means which is responsive to gas outlet pressure and which is arranged to operate the valve in response to said gas outlet pressure so as to regulate the pressure of gas flowing to the outlet, and sensor means co-operating with said control means, the sensor means being arranged to operate indication means in response to a predetermined operation of the control means.

6 Claims, 4 Drawing Sheets

GAS QUANTITY MEASURING DEVICE

The present invention relates to a gas quantity measuring device for a liquified gas container.

Certain gases, such as butane and propane, are commonly stored in containers in a liquified form under pressure. The container is usually provided with a pressure regulator which serves to control flow of gas out of the container such that an appliance supplied with gas receives its supply of gas at a regulated pressure.

It is a recognised problem with the storage of liquified gas to provide a meaningful indication that the quantity of liquified gas in the container is about to expire and therefore replacement of the container ought to be considered.

It is a general aim of the present invention to provide a regulator valve which incorporates indicator means which operate to indicate when the quantity of liquified gas contained within the container has fallen below a predetermined quantity. Accordingly the user of the container is able to determine that the container only contains a certain quantity of liquified gas and is therefore warned that the supply of gas is about to run out.

According to one aspect of the present invention there is provided a liquified gas pressure regulator including a gas inlet and a gas outlet, a valve for controlling flow of gas from the inlet to the outlet, a control means which is responsive to gas outlet pressure and which is arranged to operate the valve in response to said gas outlet pressure so as to regulate the pressure of gas flowing to the outlet, and sensor means co-operating with said control means the sensor means being arranged to operate indication means in response to a predetermined operation of the control means.

Preferably the control means includes a diaphragm which moves in response to the pressure of gas flowing to the outlet from said valve, the sensor means being operative to sense movement of the diaphragm. Preferably the sensor means is mechanically linked to a movable indicator which provides a visual indication when a predetermined quantity of liquified gas remains in the container.

Preferably the mechanical link between the diaphragm and the indicator is such as to only operate when the diaphragm moves in excess of a predetermined amount.

Various aspects of the present invention are hereinafter described with reference to the accompanying drawings, in which.

Figure 1:
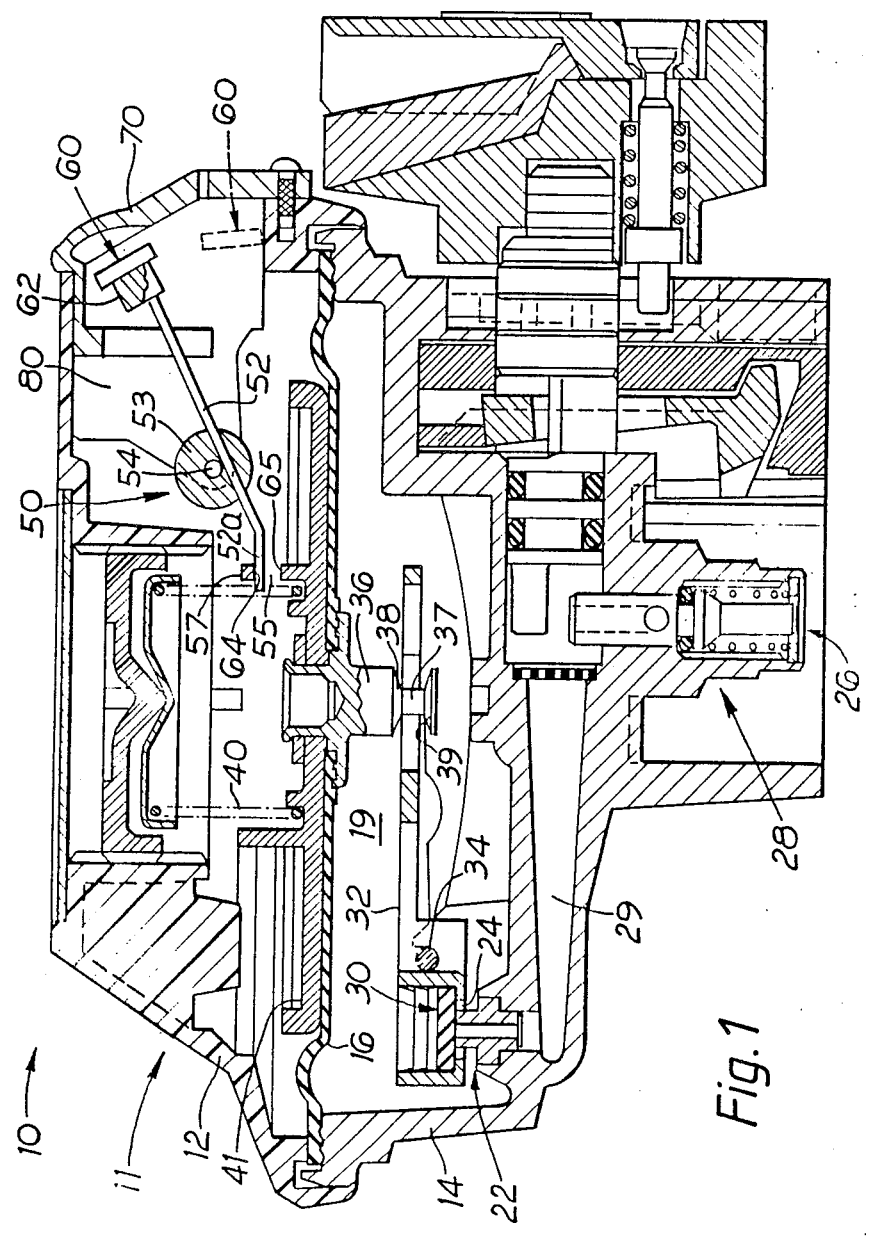
FIG. 1 is a cross-sectional view of a regulator device according to the present invention.

Referring initially to FIG. 1, the regulator device 10 includes a housing 11 including an upper casing 12 attached to a lower casing 14. Sandwiched between the upper and lower casings is a diaphragm 16. Located below the diaphragm is a gas outlet chamber 19 which includes a gas outlet port (not shown) for connection to an appliance. Gas is supplied into the gas outlet chamber 19 through a valve 22. Valve 22 includes a nozzle 24 which communicates with a gas inlet 26 of the regulator via a combined coupling and valve 28 and passage 29.

The outlet orifice of nozzle 24 is closed by a valve member 30 in the form of a resilient pad which is carried at one end of a pivotted lever 32. The lever 32 is pivotally attached to the lower casing 14 by a pivot pin 34.

The end of the lever 32 opposite to the end carrying valve member 30 is connected to the diaphragm 16 via a pin 36. The pin 36 is secured to the diaphragm 16 at one end and at its other end has a reduced diameter portion 37 received in a slot formed in the lever 32. The reduced diameter portion 37 defines opposed shoulders 38, 39 which abut opposite faces of the lever 32. Accordingly axial movement of pin 36 in either direction causes a positive movement of the lever 32.

The diaphragm 16 is biased downwardly by a spring 40 which is located between the upper casing 12 and diaphragm plate 41 which abuts against the diaphragm 16. The construction of the lower casing 14, diaphragm 16, valve 22 lever 32 and coupling valve 28 is conventional and operation of the regulator for regulating the pressure of gas to be supplied to the appliance is conventional viz, diaphragm 16 responds to relatively low pressure in the outlet chamber 19 by deflecting downwardly and thereby opening valve 22 by moving the valve member 30 away from the nozzle 24. Opening of valve 22 causes pressurised gas to enter chamber 19 which, if of a sufficiently high pressure, causes the diaphragm 16 to rise and thereby close the valve 22.

In accordance with the present invention it has been determined that such movement of the diaphragm 16 can provide a meaningful indication of when the supply of liquified gas has reached a predetermined quantity.

In this respect, a sensing means 50 is provided for sensing movement of the diaphragm 16. The sensing means 50 includes a lever 52 which is secured to a rotatable hub 53 mounted on a shaft 54. The lever 52 at one end 52a projects into a slot 55 formed in an annular flange 57 located on diaphragm plate 41. An indicator 60, preferably in the form of a coloured piece of plastics is mounted on the opposite end of lever 52 so as to be movable between upper and lower limit positions. In FIG. 1 the indicator 60 is shown in solid lines in its upper limit position and is shown in broken lines in its lower limit position. A weight 62 is attached to lever 52 adjacent to the indicator 60 and provides a bias such that end 52a is urged upwardly.

Preferably the lever 52 is arranged to amplify the displacement caused by the diaphragm so that the movement undergone by the indicator 60 is greater than that undergone by the diaphragm. In the illustrated embodiment this is achieved by locating the pivot of axis of hub 53 closer to end 52a of the lever. In the illustrated embodiment the ratio of amplification is approximately 1 to 4.

The slot 55 has an upper edge 64 and a lower edge 65 and as illustrated, the upper edge 64 is in contact with end 52a of lever 52. The diaphragm 16 is illustrated in its maximum deflected position caused by spring 40 and has therefore caused the indicator 60 to rise to its upper limit position. In this position of the diaphragm 16, the valve 22 is fully open. A window 70, preferably formed from a clear plastics material is provided such that as indicator 60 rises it progressively covers the window 70 and thereby provides a visual indication as to the amount of liquified gas remaining in the container to which the regulator is connected. When the indicator has covered the window fully the container will be usefully exhausted of liquified gas.

The sensor 50, indicator 60 and window 70 are preferably formed as a sub-assembly for insertion into the upper casing 12. In this respect a pair of arms 80 (only one being visible) are provided which are attached to the window 70 and serve to support the shaft 54.

This enables a conventional regulator to be converted to provide a visual indication of gas quantity in accordance with the present invention by a slight modification to a conventional upper casing 12 and provision of a modified diaphragm plate 41.

The spacing between edges 64, 65 and end 52a and the deflection of diaphragm 16 are interrelated and arranged so that a desired indication is achieved. In this respect the arrangement is chosen so that whilst the outlet pressure of gas being used is maintained at a fairly constant level the sensor does not operate the indicator 60.

However, when the outlet pressure of gas being used begins to fall movement of the indicator 60 is initiated. Accordingly whilst the pressure of gas in the container is above a predetermined level the diaphragm is deflected upwardly against the bias of spring 40 by gas pressure in the chamber 19, the diaphragm 16 deflecting over a small range of movement to operate valve 22 to maintain the desired outlet pressure. In this range of movement the end 52a of the lever is not contacted by the edges 64, 65. However as the pressure of gas in the container falls below the predetermined level, the pressure in the outlet chamber falls below the constant level and so the diaphragm will progressively deflect further under the bias of spring 40 as the outlet pressure continues to fall.

Figure 3:
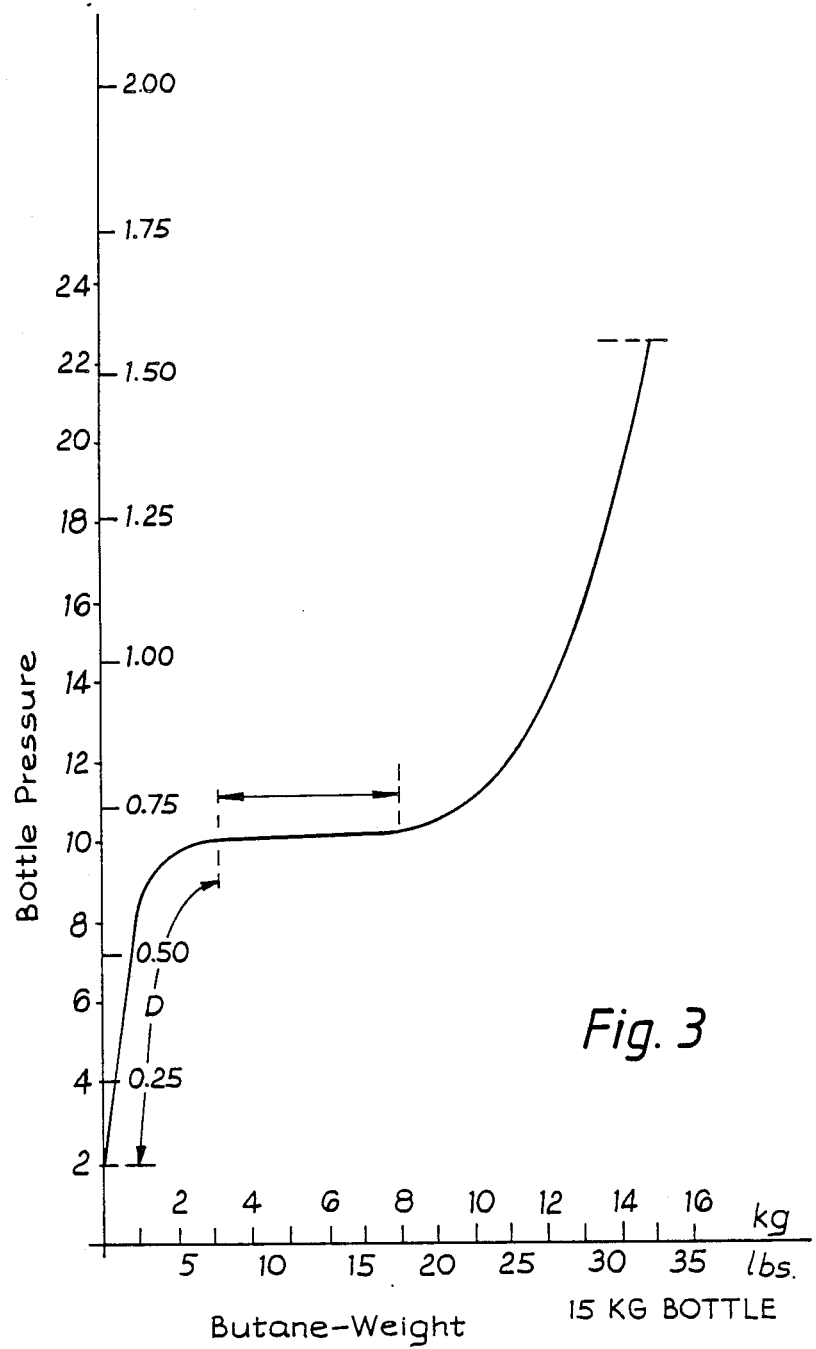
FIG. 3 is a graph showing gas inlet pressure in relation to weight of liquified gas in a container during withdrawl of gas from the container.

As illustrated in FIG. 3, there is a specific relationship between the amount of liquified gas contained in a container and the pressure within the container whilst gas is being withdrawn therefrom. The predetermined level of pressure within the container below which progressive deflection of the diaphragm occurs is preferably chosen to be at some point along region D of the graph in FIG. 3. Thus when the indicator 60 begins to move it will be known that said point along region D has been reached and that therefore a predetermined amount of liquified gas will be present in the container. This will give the user a warning that the container requires replacement. The rate at which the container will empty depends on the rate of use of the gas and this rate will be reflected by the speed at which the indicator 60 passes across the window.

Figure 2:
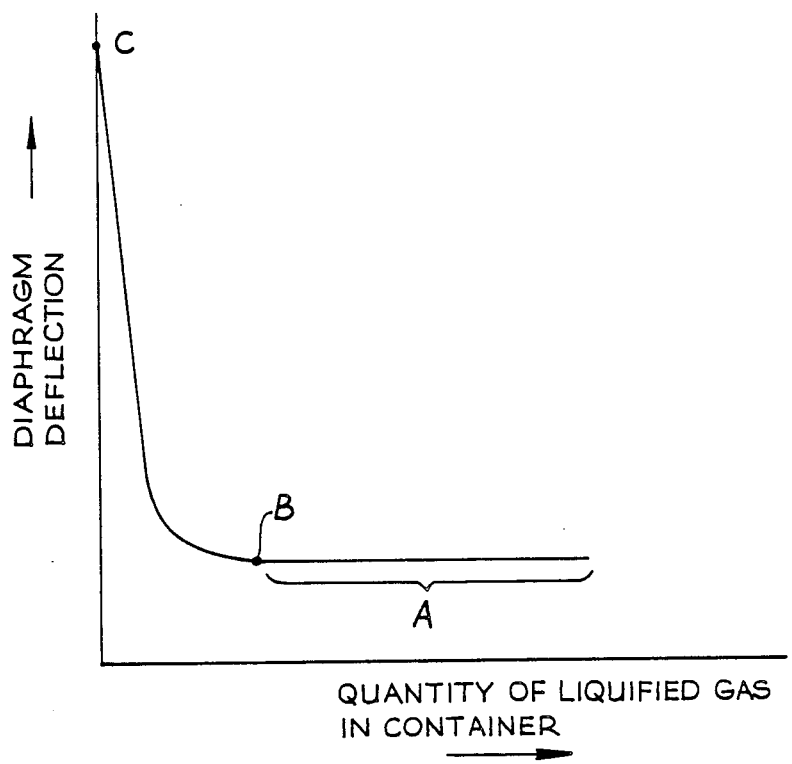
FIG. 2 is a graph showing deflection of the diaphragm shown in FIG. 1 in response to quantity of liquified as in the container.

The deflection of the diaphragm 16 in relation to the quantity of liquified gas in the container is schematically illustrated in FIG. 2. During region A of the graph, the pressure within the container is sufficiently high to enable the diaphragm 16 to operate to maintain the outlet pressure fairly constant. At point B the pressure within the container is no longer sufficiently high to enable the diaphragm to maintain a constant outlet pressure and therefore the outlet pressure begins to fall causing a corresponding deflection in diaphragm 16.

As seen in FIG. 2, an initial gradual decline in outlet pressure is experienced causing a gradual increase in deflection of the diaphragm. This is followed by a rapid decline in outlet pressure until zero pressure is reached at point C whereat maximum deflection of the diaphragm is experienced.

The relationship between edges 64, 65 of slot 55 and end 52a is arranged such that the upper edge 64 engages end 52a at some desired point along the graph from B to C.

Point B is reached when the pressure in the container has reduced to a predetermined level which for example is chosen to be 5 kg for a bottle containing 19 kg of liquified gas.

It is to be borne in mind that the quantity indication provided by the present device is meaningful whilst gas is being supplied in an uninterrupted manner: it will be appreciated that when supply of gas is interrupted the pressure in the system (i.e. the bottle and piping supplying an appliance) will rise to the saturated vapour pressure of the gas whilst there is sufficient liquified gas remaining in the bottle.

The regulator of the present invention may be used to also indicate whether there is a leak in the system downstream of the valve 22. This is done by closing off the appliance fed with gas and opening and then closing off valve 28. Opening of valve 28 will pressurise the outlet chamber 19 and cause the indicator 60 to move out of registry with the window 70. If there is a leak in the system, chamber 19 will gradually vent and accordingly the indicator 60 will reappear in the window.

In addition, the regulator will indicate whether there is a leak upstream of the diaphragm in the valve 28. In this respect if chamber 19 is vented with valve 28 closed the indicator will fully cover the window. If such a leak exists and the outlet chamber is closed (by for example being connected to a closed off appliance) the chamber 19 will gradually pressurise and so the indicator will gradually disappear from the window indicating the existance of a leak.

The regulator described above is primarily designed for use in the regulation of liquifiable gases such as propane or butane or other similar gases. The outlet pressure for supply to the appliance is normally substantially less than 1 p.s.i., typically 0.25 p.s.i. The inlet pressure may vary depending on whether the regulator is directly connected to the bottle source or indirectly connected via one or more intermediate regulators. In the former case the inlet pressure could be about 160 p.s.i. whereas in the latter case the inlet pressure could be say 6 p.s.i.

Figure 4:
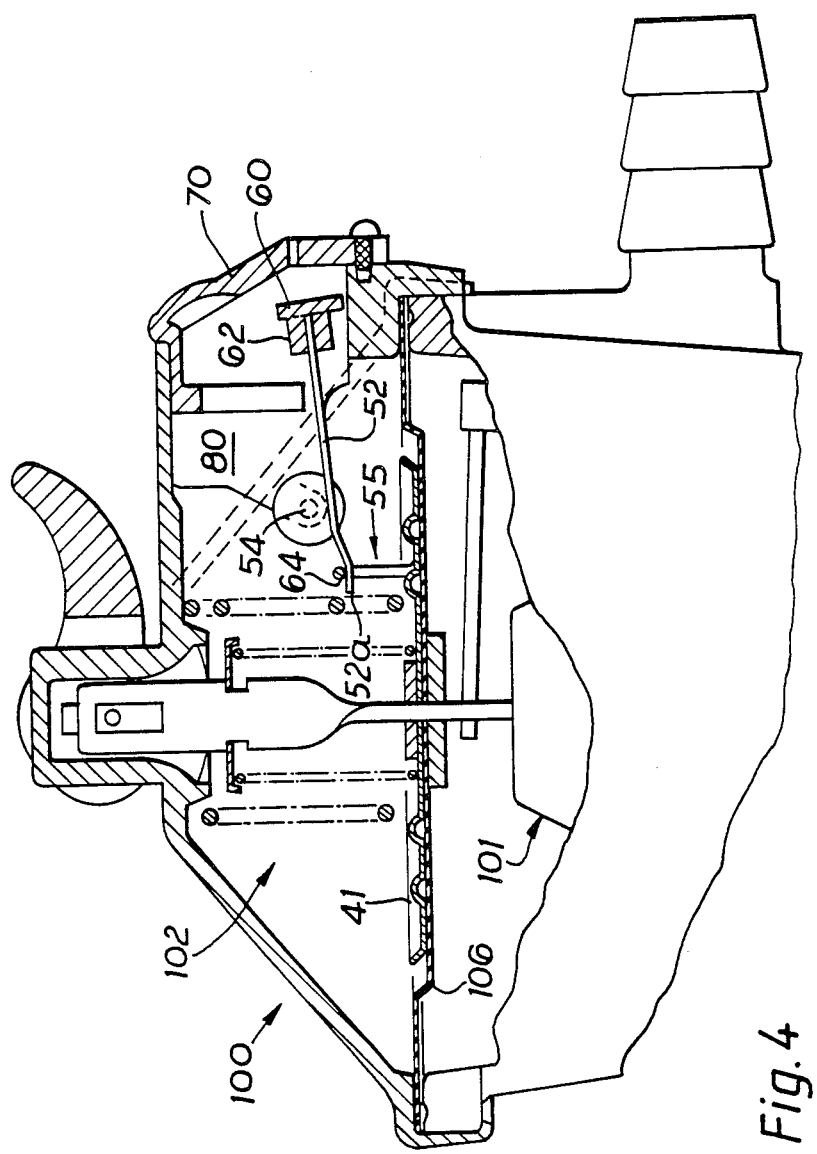
FIG. 4 is a part side view, partially in section, of a further embodiment according to the present invention.

By way of illustration there is shown in FIG. 4 a regulator device 100 of the type supplied by Butano SA, Spain, which is a regulator device incorporating two regulators 101, 102 in series to provide a regulated reduction in pressure. The first regulator 101 serves to supply the second regulator 102 with a predetermined inlet pressure and the second regulator 102 then further reduces the pressure of the gas to the desired outlet pressure of the regulator device 100. The diaphragm 106 of the second regulator 102 is utilised to provide the desired monitoring of quantity of liquified gas. In FIG. 4, parts similar to those illustrated in FIG. 1 have been represented by the same reference numerals.

I claim:

1. A liquified gas pressure regulator for connection to a container containing liquified gas, the regulator including a body having a gas inlet, a gas outlet and a pressure chamber communicating with said gas inlet and outlet, the pressure chamber communicating with the inlet via a valve, the pressure chamber in part being defined by a control diaphragm which is responsive to gas pressure in the pressure chamber, the diaphragm being operatively connected to the valve and being resiliently biased for deflection in a direction to cause opening of the valve in response to gas pressure in the pressure chamber falling below a predetermined constant value, the diaphragm being deflectable in an opposite direction by gas pressure in excess of said constant value to close said valve and thereby operating to maintain the constant pressure value in said chamber whilst pas pressure in said inlet exceeds said constant value, the diaphragm also being operatively connected to sensor means which operate indication means in response to deflections of the diaphragm which occur whilst the gas pressure in said inlet falls below said constant value to thereby provide an indication when a predetermined quantity of liquified gas remains in the container.

2. A regulator according to claim 1 wherein the sensor means includes a lever pivotally mounted in the body, one end of the lever being connected to the diaphragm so as to be moved thereby, the opposite end of the lever being connected to said indication means to provide said indication.

3. A regulator according to claim 2 wherein the body includes a window and said opposite end of the lever carries an indicator which passes across said window to provide said indication.

4. A regulator according to claim 3 wherein the end of the lever connected to the diaphragm engages in a slot formed in a mounting plate attached to the diaphragm, the lever being biased against a stop so as to be unaffected by deflections of the diaphragm whilst the inlet gas pressure is sufficient to maintain the gas pressure chamber at said constant pressure value, the mounting plate engaging said end of the lever to cause its deflection as the diaphragm deflects in response to fall in gas pressure at said inlet below said constant pressure valve.

5. A regulator according to claim 4 wherein the body is splitable into an upper body portion and a lower body portion, the lower body portion containing said gas inlet, outlet and gas pressure chamber, the upper body portion containing said indication means.

6. A regulator according to claim 5 wherein the lever indicator and window are formed as a sub-assembly for insertion into the upper body portion.

* * * * *